United States Patent Office 3,497,465
Patented Feb. 24, 1970

3,497,465
LOW TEMPERATURE-STABLE POLYURETHANE FOAMS AND COMPOSITIONS CONTAINING DERIVATIVES OF PHENOL-ALDEHYDE RESINS USEFUL FOR PREPARING SAID POLYURETHANES
Francis M. Kujawa, Tonawanda, Richard B. Tideswell, Buffalo, N.Y., and Gerald R. Chamberlain, Niagara Falls, Ontario, Canada, assignors to Hooker Chemical Corporation, Niagara Falls, N.Y., a corporation of New York
No Drawing. Filed Nov. 28, 1966, Ser. No. 597,222
Int. Cl. C08g 53/08, 41/04
U.S. Cl. 260—2.5          19 Claims

ABSTRACT OF THE DISCLOSURE

Polyurethanes that are especially useful in low temperature applications such as in refrigerators, refrigerated trucks and railway cars are produced by reacting an organic polyisocyanate with a composition which comprises: (A) a phenolic polyol such as oxyalkylated phenol-aldehyde resin, (B) a polyol of an alcohol having 4 to 6 hydroxyl groups and a 1,2-epoxide, (C) a dihydric alcohol, (D) an alkanolamine and (E) a phosphorus compound. Cellular products are produced by incorporating a foaming agent in the reaction mixture.

---

This invention relates to novel resinous compositions containing phenol-aldehyde resin derivatives, to improved polyurethane compositions containing said resinous products, and to methods for preparing the foregoing compositions.

The compositions of the invention are useful in the preparation of foamed or cellular plastic products, adhesives, binders, laminates, coatings, potting compounds, and the like.

Oxyalkylated phenol-aldehyde resins have been found to be useful in the preparation of various polymeric products including polyurethane compositions and foamed products. Despite the noteworthy properties of such compositions, the ever increasing demands of industry for even better products has required that still further improvements be made. One such area of interest is in the field of compositions suitable for use in low temperature applications such as in refrigerators, refrigerated trucks and railway cars.

Accordingly, it is an object of this invention to provide resinous products capable of imparting outstanding physical properties to polyurethane compositions when incorporated therein. Another object of the invention is to provide polyurethane compositions having improved low temperature properties. It is a further object of the invention to provide polyurethane foams that have improved mechanical properties such as compressive modulus, compressive strength, tensile strength, shear strength, and the like. It is another object of the invention to provide polyurethane compositions that by mere adjustment of the level of catalyst employed, can be employed as fast curing systems for use in spray foam applications, or in systems requiring a longer reaction time but which still have good curing characteristics. These and other objects will be apparent to those skilled in the art from consideration of the following detailed specification.

In accordance with the invention there is provided a composition comprising the following components:

(A) 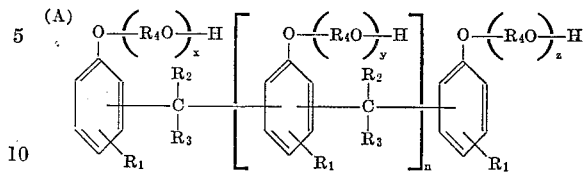

wherein:
$n$ has an average value of about 0.2 to 5, preferably about 0.5 to 3;
$x$, $y$ and $z$ are integers from 1 to 100;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen-substituted hydrocarbon radical; and
$R_4$ is a hydrocarbon radical;

(B) a polyol prepared from an alcohol having at least four hydroxyl groups, and at least one mole of a 1,2-epoxide per hydroxyl group of the alcohol;
(C) a dihydric alcohol;
(D) an alkanolamine; and
(E) a phosphorus compound.

The thus-described composition can be reacted directly with an organic polyisocyanate to produce a polyurethane composition, and in the presence of a foaming agent to produce a polyurethane foam. While the foregoing components have been used individually in the preparation of polyurethane compositions, they have not been heretofore used simultaneously in a single composition because what have heretofore been considered to be conflicting influences of the several components. Accordingly, it was unexpected that the combination of the foregoing components would provide a polyurethane composition of outstanding physical properties.

(A) The phenolic polyol

The phenolic resinous polyol can be prepared by the process comprising reacting together:
(1) A fusible, organic solvent-soluble condensation product of a phenol and an aldehyde or ketone containing condensate units having reactive phenolic hydroxyl groups, and
(2) A substance reactive with the phenolic hydroxyl group and selected from the group consisting of a mono oxirane ring compound, an alkylene halohydrin and an alkylene carbonate.

The phenolic resinous polyol can also be prepared by first reacting a phenol with the substance reactive with the phenolic hydroxyl groups, and thereafter condensing the modified phenol with an aldehyde or ketone.

Fusible, organic solvent-soluble condensation products of a phenol and an aldehyde or ketone suitable for use as starting materials in practicing the invention are well known to the art and can be prepared by well known methods. The phenol-aldehyde or phenol-ketone condensate should be soluble in organic solvents such as acetone and it should not be advanced to the insoluble "C" stage or resite stage. When the phenol is phenol itself and the aldehyde is formaldeyhde, one type of condensation which is highly satisfactory contains condensation units which can be exemplified by the following formula:

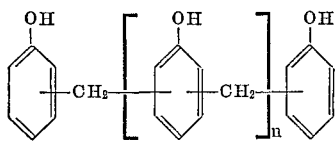

wherein $n$ represents a numeral varying from one to ten, and often higher provided the resin is fusible and acetone or organic solvent-soluble. Preferably, the phenol-aldehyde condensate is a novolac, which contains more than one mole of phenol per mole of aldehyde or ketone.

Examples of phenols which can be used in preparing phenol-aldehyde condensates for use in practicing the invention include phenol itself or substituted phenols, wherein at least about half the substituted phenols have at least two of the ortho and para positions of the phenol nucleus available for condensation reaction (unsubstituted). Such phenols have the following general formula:

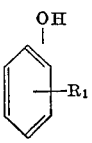

where $R_1$ can be hydrogen, fluorine, chlorine, bromine or a suitable substituent selected from the following:

(a) Alkyl and alkenyl groups of 1 to 18 carbon atoms in any of their isomeric forms and substituted on the phenolic nucleus in the ortho, meta or para positions;

(b) Alicyclic groups of 5 to 18 carbon atoms such as cyclohexyl, cyclopentyl, methyl, cyclohexyl, butyl cyclohexyl, and the like;

(c) Aromatic or aralkyl groups of 6 to 18 carbon atoms such as phenyl, alpha-methyl benzyl, benzyl, cumyl and the like;

(d) Alkyl, alkenyl, alicyclic, aryl and aralkyl ketones wherein the hydrocarbon is defined hereinbefore;

(e) Alkyl, alkenyl, alicyclic, aryl and aralkyl carboxylic groups wherein the hydrocarbon is defined hereinbefore, and mixtures thereof. As indicated, the hydrocarbon radicals preferably have 1 to 18 carbon atoms.

Suitable substituted phenols include the following: para - tertiary - butylphenol, para - chlorophenol, para-tertiary - hexylphenol, para - isooctylphenol, para-phenylphenol, para - benzylphenol, para - cyclohexylphenol, para - octadecylphenol, para - nonylphenol, para - beta-naphthylphenol, para - alpha - naphthylphenol, cetylphenol, para - cumylphenol, para - hydroxyacetophenone, para - hydroxybenzophenone, a phenol alkylated with limonene, a phenol alkylated with oleic acid, as well as the corresponding ortho and meta derivatives such as meta-butylphenol and ortho-butylphenol, as well as mixtures thereof.

Aldehydes or ketones or mixtures thereof capable of reacting with a phenol are satisfactory, provided the aldehydes or ketones do not contain a functional group or structure which is detrimental to the condensation reaction or with oxyalkylation of the condensate. The preferred aldehyde is formaldehyde, which can be in aqueous solution or in any of its low polymeric forms such as paraform or trioxane. The aldehydes preferably contain 1 to 8 carbon atoms. Other examples include acetaldehyde, propionaldehyde, butyraldehyde, benzaldehyde, furfural, 2 - ethylhexanal, ethylbutyraldehyde, heptaldehyde, pentaerythrose, glyoxal, chloral, mesityl oxide, and the like. The ketones have the formula:

wherein $R_2$ and $R_3$ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. $R_2$ and $R_3$ preferably have 1 to 7 carbon atoms.

The ratio of aldehyde or ketone to the phenol (or oxyalkylated phenol) can be varied to prepare condensates of various molecular weights and viscosity of the final condensation product can be regulated by the molecular weight of the phenol-aldehyde or phenol-ketone condensate. Preferbaly, the amount of aldehyde or ketone varies from 0.2 to 1.0 mole per mole of the phenol (or oxyalkylated phenol) when a mono- or difunctional phenol is used. In instances where a trifunctional phenol is used, the preferred upper ratio of aldehyde or ketone is about 0.85 mole per mole of phenol (or oxyalkylated phenol). It is preferred that the aldehyde or ketone and phenol be reacted using an acid catalyst such as sulfuric, hydrochloric or oxalic acid, but basic catalysts also can be used. In some instances, catalysts are not necessary. Examples of alkaline catalysts include ammonia, amines and quaternary ammonium bases. Wetting agents of the anionic type such as sodium alkyl aryl sulfonate, can be used to speed up the reaction when acids are used.

In instances where a resole is prepared, more than one mole of formaldehyde per mole of phenol (or oxyalkylated phenol) is useful. The specific phenols and aldehydes or ketones which can be used are described above, and the alkaline catalysts described above also are useful. The resoles have methylol groups, as well as phenolic hydroxyl groups, which can be reacted with the reagents to be discussed hereinafter.

In accordance with the present invention, improved condensation products can be prepared which preferably contain substantially no free reactive phenolic groups, i.e., less than about 5 percent, but preferably less than about 0.5 percent of the phenolic hydroxyl present originally in the phenol-aldehyde or phenol-ketone condensate The preferred method of hydroxyalkylation is by reaction with compounds containing a mono oxirane ring Monomeric epoxides having 2 to 18 carbon atoms are perferred. Examples of mono-epoxides that can be employed are ethylene oxide, propylene oxide, butylene oxide, cyclohexane oxide, 2,3-epoxyhexane, epichlorohydrin, styrene oxide, allyl glycidyl ether, methyl glycidyl ether, butyl glycidyl sulfide, glycidyl methyl sulfone, glycidyl methacrylate. glycidyl allyl phthalate, and the like. The preferred mono-epoxides are the mono-epoxide substituted hydrocarbons, the mono-epoxy-substituted ethers, sulfides, sulfones and esters, wherein the said compounds contain 2 to 18 carbon atoms. Minor amounts of di-epoxides can also be incorporated into the compositions. Typical di-epoxides are 3,4 - epoxy - 6 - methylcyclohexylmethyl - 3,4 - epoxy - 6 methylcyclohexane-carboxylate, dicyclopentadiene dioxide, limonene dioxide, 4,4'-(diglycidyl) diphenylpropane, vinylcyclohexane dioxide. Many other epoxides can be used, but the alklyene oxides containing 2 to 6 carbon atoms are generally used.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. Combinations of catalysts can be used to excellent advantage in obtaining particular products. For example, an amine catalyst, such as triethylamine can be used to add a mole of propylene oxide to each phenolic hydroxyl group, and thereafter hydroxyalkylation can be continued with ethylene oxide using as catalyst an alkali metal hydroxide, such as sodium hydroxide. In general, the hydroxyalkylation reaction can be carried out at 50 to 250 degrees centigrade. The hydroxyalkylation of the phenols is preferably performed at 50 to 150 degrees centigrade; the hydroxyalkylation of the phenolic condensates proceeds at better rates at 150 to 250 degrees centigrade. Solvents are not normally preferred, although solvents can be used for the higher molecular weight resins to reduce viscosity.

The phenolic hydroxyl of the phenols or the phenolic condensates can also be hydroxyalkylated by reacting alkylene halohydrins with the phenolic hydroxyl using equivalent amounts of an alkali metal hydroxide to bring about the reaction. Suitable alkylene halohydrins are ethylene chloro- or bromohydrins, propylene chloro- or bromohydrins, 2,3-butylene chloro- or bromo-hydrins, glyceryl chloro- or bromohydrins.

Another method for hydroxyalkylating novolacs is by reaction with alkylene carbonates such as ethylene carbonate and propylene carbonate, using a catalyst such as sodium or potassium carbonate.

In the preparation of the phenol-aldehyde or phenol-ketone condensation product, there should be at least one hydroxy-alkyl group per phenol-aldehyde or phenol-ketone molecule. It is preferred that there be at least about one mole of hydroxyalkylation agent per mole of phenolic hydroxyl. However, products prepared by reaction with a number of units of hydroxyalkylation agent per mole of phenolic hydroxyl are often desired, since the physical properties of the polyurethane composition can be adjusted by controlling the ether chain length. Also, the hydroxyl number of the modified phenol-aldehyde condensate can be adjusted by controlling the ether chain length. The length of the ether chain determines whether the polyurethane foams are rigid, semirigid or flexible. Generally, for rigid foams, it is not desired to react more than ten moles of the hydroxyalkylation agent per mole of phenolic hydroxyl. It is often desirable to hold the ether chain length to a minimum so that the physical properties of the foams are maximized. The principal criterion is that the length of the ether chain is selected to give the desired balance between the viscosity of the condensation product and the physical properties of the finished foam. In the production of flexible foams, the required ether chain length is dependent on the molecular weight of the phenol-aldehyde or phenol-ketone condensate, but is usually less than 25 units of hydroxyalkylation agent per mole of phenolic hydroxyl, and generally does not exceed about 100 units per mole. The hydroxyl number of the phenolic condensation products of the invention is generally in the range of 200 to 950 for rigid foams and 30 to 200 for flexible to semirigid foams.

(B) The alcoholic polyol component

This component is prepared by reacting a polyhydric alcohol with a mono epoxide. Suitable polyhydric compounds are those having four to six hydroxyl groups, such as pentaerythritol, dipenta-aerythritol, sorbitol, mannitol, α-methyl glucoside, dextrose, fructose, anhydroaneaheptitol, 2,2,6,6-tetramethylolcyclohexanol, and the like. The polyhydric alcoholic compounds generally contain up to 15 carbon atoms. Suitable monomeric 1,2-epoxides are the epoxides listed hereinbefore. The preferred epoxides are the alkylene oxides having 2 to 6 carbon atoms. The polyhydric alcohol and epoxides are reacted in a ratio to provide one to ten epoxide residues per alcoholic hydroxyl group. Even longer epoxide residue chains can be employed if desired. The oxyalkylation conditions disclosed hereinbefore are suitable for the reaction.

It is within the scope of the invention to provide components (A) and (B) by physically admixing the two separately prepared components. Alternatively, these two components can be provided by first blending or admixing a phenol-aldehyde or ketone condensate and the polyhydric alcohol of the nature defined hereinbefore, and thereafter subjecting the mixture of components to an oxyalkylation reaction with any of the suitable oxyalkylation reactants described hereinbefore so that the oxyalkylation of the phenolic and alcoholic components is conducted in the same step.

The alcoholic polyol component generally comprises at least 5 parts by weight per 100 parts by weight of the phenolic polyol component (A). Proportions up to 25 parts per 100 parts by weight are preferably employed, but higher proportions, for example, up to 50 parts per 100 parts by weight of the phenolic polyol component can be employed.

(C) The dihydric alcohol

Suitable dihydric alcohols for use in the invention include ethylene glycol, diethylene glycol, triethylene glycol, propylene glycol, dipropylene glycol, polypropylene glycol, 1,2-butylene glycol, 1,3-butylene glycol, 1,4-butylene glycol, neopentyl glycol, hexamethylenediol-1,6; octamethylenediol-1,8; decamethylenediol-1,10, and the like. The dihydric alcohols preferred in the practice of the invention generally have 2 to 10 carbon atoms. The dihydric alcohols are generally employed in the compositions of the invention in a proportion from about 1 to about 15 parts by weight per 100 parts by weight of the phenolic polyol component (A).

(D) The alkanolamine

Additional hydroxyl functionality is incorporated in the compositions of the invention in the form of an alkanolamine. Such compounds are also catalytic as a result of the amine group. Suitable alkanolamines include trialkanolamines such as triethanolamine, tripropanolamine, and the like; alkyl dialkanolamines such as methyl diethanolamine, ethyl diethanolamine, and the like; and dialkyl alkanolamines such as diethyl ethanolamine, dimethyl ethanolamine, diethyl propanolamine, and the like. The alkyl groups of the amine compounds generally have 1 to 8 carbon atoms. The alkanolamines are generally employed in a proportion from about 1 to about 15 parts by weight per 100 parts by weight of the phenolic polyol component (A).

(E) The phosphorus component

Suitable phosphorus compounds for use in the invention include phosphorus compounds having the formula:

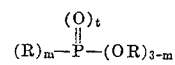

wherein:

$t$ is an integer from 0 to 1;
$m$ is an integer from 0 to 3 when $t$ is 1;
$m$ is an integer from 0 to 2 when $t$ is 0; and
R is selected from the group consisting of alkyl, halogen-substituted alkyl, aralkyl, alkaryl and aryl.

The hydrocarbon radicals preferably contain from 1 to 20 carbons atoms. Compounds wherein the hydrocarbon radicals join to form a ring are also contemplated, such as phenyl ethylene phosphite. The alkyl groups can be substituted with a mixture of halogen atoms, such as mixtures of chlorine and bromine atoms. Typical groups of phosphorus compounds that can be employed in accordance with the invention include the following:

Third degree esters of phosphoric acid (tertiary phosphates);
Second degree esters of phosphonic acid (secondary phosphonates);
First degree esters of phosphinic acid (phosphinates);
Tertiary phosphine oxides;
Third degree esters of phosphorous acid (tertiary phosphites);
Second degree esters of phosphonous acids (secondary phosphonites); and
First degree esters of secondary phosphine oxides (phosphinites).

Illustrative examples of the foregoing compounds are disclosed in U.S. Patent No. 3,257,337.

Also useful are the "phosphorus acids" which include not only the mineral acids such as phosphoric acid and those acids having direct carbon-to-phosphorus bonds such as the phosphonic and phosphinic acids, but also those partially esterified phosphorus acids which contain at least one remaining unesterified acid group such as the first and second degree esters of phosphoric acid and the like. Typical phosphorus acids and groups of acids that can be employed in the invention include the following:

Phosphoric acid;
Phosphorous acid;
Hypophosphorous acid;
Phosphonic acids;
Phosphinic acids (secondary phosphonic acid);
Phosphonous acids;
First degree esters of phosphoric acid (primary phosphates);
Second degree esters of phosphoric acid (secondary phosphates);
First degree esters of phosphorous acid (primary phosphites);
Second degree esters of phosphorous acid (secondary phosphites);
First degree esters of phosphonic acid (primary phosphonates);
First degree esters of phosphonous acid (primary phosphonites).

Illustrative examples of the foregoing acid phosphorus compounds are disclosed in U.S. Patent No. 3,257,337.

Phosphorus compounds of all the foregoing types wherein sulfur is substituted for the oxygen atoms can also be employed.

Another class of phosphorus compounds useful in the invention in the preparation of polyurethane compositions are the compounds having the formula:

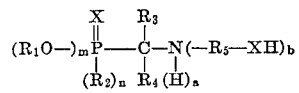

wherein $m$ and $n$ have a numerical value of 0 through 2, and $m+n$ equals 2; $a$ has a value of 0 or 1; $b$ has a value of 1 or 2; and $a+b$ equals 2; X is oxygen or sulfur; $R_1$, $R_2$, $R_3$ and $R_4$ are organic radicals selected from the group consisting of alkyl, cycloalkyl, alkenyl, aryl, alkylaryl, arylalkyl, and halo-substituted organic radicals of the foregoing group; and $R_3$ and $R_4$ can also be hydrogen, and $R_5$ is an alkyl group.

Examples of the foregoing compounds are dimethyl-N-(2′-hydroxyethyl) - 2 - aminoisopropyl - 2 - phosphonate; dimethyl - N - (2′-hydroxyethyl) - 2 - aminoethyl-2-phosphonate; dibutyl-N-bis-(2′-hydroxyethyl)-2-aminoethyl-2-phosphonate; and dimethyl - N - bis - (2′-hydroxyethyl)-aminomethyl-2-phosphonate.

Other useful phosphorus compounds that can be used in the invention are the esters of phosphonic acid having the formula:

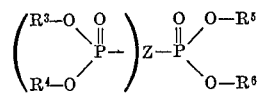

wherein Z is selected from the group consisting of alkyl, alkylene, alkenyl, aryl-substituted alkyl, aryl, alkyl-substituted aryl, nitroalkyl, halogen-substituted aryl, heterocyclic, hydroxy-substituted alkyl, hydroxy-substituted alkylene, halogen-substituted alkylene, substituted alkenyl, halogen-substituted alkyl, hydroxy-substituted aryl, hydroxyaryl-substituted alkyl, hydroxyalkyl-substituted aryl, hydroxyalkyl-substituted heterocyclic, hydroxyalkoxyalkyl, hydroxypolyalkoxyalkyl, and mixtures thereof, $R^3$, $R^4$, $R^5$ and $R^6$ are selected from the group consisting of alkyl, aryl, alkyl-substituted aryl, aryl-substituted alkyl, nitroalkyl, halogen-substituted aryl, halogen-substituted alkyl, hydroxyalkyl, alkoxyalkyl, hydroxyalkoxyalkyl, alkenyl, substituted alkenyl, hydroxypolyalkoxyalkyl, and mixtures thereof, $n$ is from 0 to 5 and the molecule contains from 3 to about 32 hydroxyls.

Examples of the foregoing esters of phosphonic acid are bis-(oxypropylated pentaerythritol) oxypropylated pentaerythritol phosphonate; bis-(trimethylolpropane) trimethylolpropane phosphonate; bis-pentaerythritol butane phosphonate; and bis-trimethylolpropane trichlorobenzyl chloride phosphonate. The preparation of these and other compounds is disclosed in copending application Ser. No. 329,858, filed Dec. 11, 1963.

Also useful in the invention are the esters of phosphonic acid having the formula:

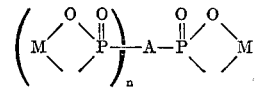

wherein M is the residue of a polyol wherein two hydroxyls are removed from a group of carbon atoms with hydroxyls attached thereto and one carbon atom between the two carbon atoms from which the hydroxyl groups have been removed, A is selected from the group consisting of an aliphatic and an aromatic radical, $n$ is selected from 0 to 5 and the molecule has 2 to 32 hydroxyl groups.

Examples of the foregoing compounds are pentaerythritol butant phosphonate; bromodipentaerythritol decane phosphonate; chlorodipentaerythritol furfuryl phosphonate; and chloro-1,1,1,3,3,3-hexamethylolpropanol-2-benzyl phosphonate. The preparation of these and other such compounds is disclosed in copending application Ser. No. 323,114, filed Nov. 12, 1963.

Another class of useful phosphorus compounds are those having the following structure:

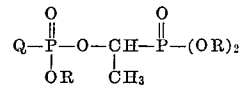

wherein R is halo-substituted alkyl, such as chloro-substituted alkyl and bromo-substituted alkyl, wherein alkyl has 2 to 6 carbon atoms, preferably 2 or 3 carbon atoms; and Q is R, or one of the groups

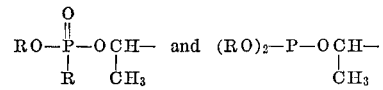

wherein R is as defined before.

Illustrative R groups are ClCH$_2$CH$_2$—,

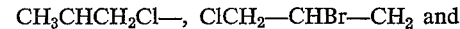

A particularly useful compound of this type has the formula:

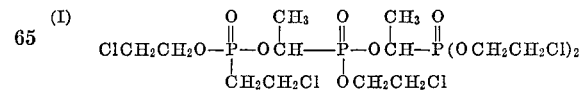

The phosphorus compounds are generally employed in a proportion from about one part up to about 20 parts by weight per 100 parts of the total weight of the hydroxyl-containing components. The preferred amount of phosphorus compound is from about 2 to about 10 parts by weight per 100 parts of the total weight of the hydroxyl-containing components.

Preparation of polyurethane compositions

Various organic polyisocyanates can be used in preparing the polyurethane compositions of the invention. Among these isocyanates are 2,4-tolylene diisocyanate, 2,6-tolylene diisocyanate, and mixtures thereof, and particularly the crude mixtures thereof that are commercially available. Other typical polyisocyanates include methylene-bis (4-phenylisocyanate), n-hexyl diisocyanates, 1,5-naphthalene diisocyanate, 1,3-cyclopentylene diisocyanate, p-phenylene diisocyanate, 2,4,6-tolylene triisocyanate, 4,4',4''-triphenylmethane triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

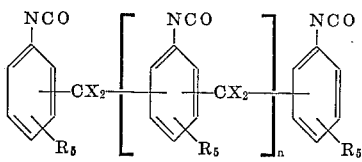

wherein:

$R_5$ is selected from the group consisting of hydrogen, chlorine, bromine, alkyl having 1 to 5 carbon atoms, and alkoxy having 1 to 5 carbon atoms;

X is selected from the group consisting of hydrogen, alkyl having 1 to 10 carbon atoms and phenyl; and $n$ has an average value of at least 1 and generally about 1 to 3.

The preferred composition of this type is polymethylene polyphenylisocyanate which is a mixture of compounds having the following generalized formula:

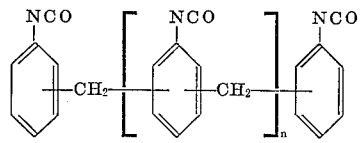

wherein $n$ has an average value of at least 1 and generally is from 1 to 3. Other typical compounds of this type include those wherein the $R_5$ groups are chlorine, bromine, methyl or methoxy, and wherein the value of X is methyl or phenyl in the generic formula.

Any foaming agent commonly used in the art can be employed. These are generally those materials that are capable of liberating gaseous products when heated, or when reacted with an isocyanate. Preferably, foaming is accomplished by introducing a low boiling liquid into the resin. The heat of reaction is then sufficient to expand the mixture to a foam stable enough to retain its shape until the resin gels. Suitable liquids are the fluorochlorocarbons boiling in the range of −30 to 50 degrees centigrade and mixtures thereof, for example, trichlorofluoromethane, trichlorofluoroethane, difluoromonochloroethane, and difluorodichloroethane. Also useful are mixtures of the fluorocarbons with chlorocarbons such as methylene chloride. Another class of foaming agents that is suitable for carrying out the foaming reaction at an elevated temperature is a tertiary alcohol in combination with a strong concentrated acid catalyst. Examples of tertiary alcohols include tertiary amyl alcohol, tertiary butyl alcohol, and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxymethylphosphonium chloride.

If desired, an additional reaction catalyst can be employed in preparing the polyurethane compositions of the invention. Generally, but not necessarily, catalysts are employed to prepare the polyurethane foams having densities up to about 6 pounds per cubic foot. For foam products having densities of 6 pounds per cubic foot and higher, when acid phosphorus additives are used, reaction catalysts are generally not needed. The catalysts employed can be any of the known conventional catalysts for isocyanate reactions, such as the tertiary amines. Many such compounds are useful in the reaction, but they generally have up to 20 carbon atoms. Typical compounds of the trialkylamines are trimethylamine, triethylamine, diethylenetriamine, tetramethyl butane diamine, and the like. Also suitable are the morpholine compounds such as N-methyl morpholine, N-acetyl morpholine, 4,4'-dithio morpholine, and the like, and the tertiary amine compounds have other functional groups such as diethyl ethanolamine, methyl diethylanolamine, N-diethyl aminoacetic acid, methyl aminodipropionic acid, N-methyl dipropylenetriamine, dimethyl piperazine, and the like. The preferred amine compounds are triethylamine and tetramethyl guanidine. Other urethane catalysts are also useful, for example, the antimony compounds, such as antimony caprylate, antimony naphthenate, and antimonous chloride; the tin compounds such a dibutyltin dilaurate, tri-n-octyltin oxide, hexabutylditin, tributyltin phospate or stannic chloride.

In preparing the polyurethane compositions of this invention, the components are preferably reacted in a ratio sufficient to provide about 85 to 115 percent of isocyanato groups with respect to the total number of hydroxyl and equivalent groups, e.g., amino, anhydride, and carboxyl groups present in the hydroxy-containing polymeric material (and the foaming agent, if one is provided). The reaction temperature generally ranges from about 20 to about 180 degrees centigrade, although higher and lower temperatures can be used.

Various additives can be incorporated in the polyurethane composition to modify the properties thereof. For example, the fire resistance of the composition can be further improved by the addition of an antimony compound. Fillers, such as clay, calcium sulfate or ammonium phosphate can be added to lower the cost; components, such as dyes can be added for color, and fibrous glass, asbestos, synthetic fibers can be added to improve strength characteristics. Surfactants are generally employed to control cell structure. Suitable cell controllers are the silicone-glycol copolymers, such a triethoxy dimethyl polysiloxane copolymerized with a dimethoxypolyethylene glycol.

The following examples illustrate the various aspects of the invention but are not intended to limit it. Where not otherwise specified, temperatures are given in degrees centigrade, parts are by weight, and viscosities are given in Gardner seconds at 50 degrees centigrade.

EXAMPLE 1

A typical modified phenol-aldehyde condensation product was prepared by introducing 3,000 parts phenol, 13 parts of oxalic acid catalyst and 6 parts of a wetting agent into a jacketed reactor and heating to 100 degrees centigrade. The anionic wetting agents of alkylaryl sulfonate type are preferred. 1,110 parts of a 37 percent aqueous formaldehyde solution were added to the reactor at such a rate that the heat of reaction provided a vigorous reflux. Refluxing was continued for two hours after the completion of the formalin addition. The reactor contents were dehydrated at 180 degrees centigrade and then dephenolated at 200 degrees centigrade at 50 millimeters vacuum. Approximately 2,030 parts of phenol-aldehyde condensate were produced. 7.2 parts of sodium hydroxide were introduced to the reactor. Ethylene oxide was then added to the reactor as either a vapor or a liquid. The reactor temperature was maintained at 190 degrees centigrade for the initial two hours and was then permitted to increase to the range of 200 to 220 degrees centigrade until the addition of 878 parts of ethylene oxide was complete. The resulting condensation product had a hydroxyl number of 370, and a Gardner viscosity of 50 degrees centigrade of about 2,000 seconds.

EXAMPLE 2

A typical modified phenol-ketone condensation product was prepared in a manner similar to the method of Example 1 by reacting 3,000 parts phenol, 820 parts acetone under refluxing conditions for four hours in the presence of ten parts of sulfuric acid catalyst and ten parts of alkylbenzene sulfonate wetting agent. After dehydration and dephenolation in the manner of Example 1, ten parts of sodium hydroxide were introduced to the phenol-acetone condensate. Then 900 parts of ethylene oxide were introduced to the reaction mixture which was maintained at 180 to 220 degrees centigrade. The resulting condensation product had a hydroxyl number of 310.

The characteristics of the compositions of Examples 1 and 2 can be drastically changed by varying the ratio of ethylene oxide to phenolic hydroxyl groups, and also by varying the ratio of phenol to aldehyde or ketone in the base condensate. In Examples 3 through 5, the ratio of ethylene oxide to phenolic hydroxyl group was varied from 2.0 to 3.0, while maintaining a ratio of phenol to aldehyde in the base condensate of three to two. In Examples 6 and 7, the phenol to aldehyde ratio was changed to five to four and the ethylene oxide ratio was varied from 1.25 to 1.72. The effects on viscosity, as well as hydroxyl number, of the resulting addition products are shown in Table I. All other conditions in Examples 3 to 7 are the same as those in Example 1.

TABLE I

| Example No. | Ratio of phenol to aldehyde in base condensate | Ratio of ethylene oxide to hydroxyl group | Hydroxyl No. | Viscosity |
| --- | --- | --- | --- | --- |
| 1 | 3/2 | 1.0 | 376 | 2,000 |
| 3 | 3/2 | 2.0 | 301 | 52 |
| 4 | 3/2 | 2.5 | 267 | 23 |
| 5 | 3/2 | 3.0 | 250 | 13.7 |
| 6 | 5/4 | 1.25 | 340 | 19,500 |
| 7 | 5/4 | 1.72 | 292 | 545 |

The viscosities and hydroxyl numbers of the condensation products can also be varied by changing the type of alkylene oxide employed while holding both the chain length of the base condensate, as well as the length of the alkylene oxide side chains constant. In Examples 8, 9 and 10, the method of preparation of Example 4 is repeated except that a portion of all of the ethylene oxide is replaced with propylene oxide. The hydroxyl numbers and viscosities of the resulting addition products are shown in Table II where these values are compared with those obtained in Example 4.

TABLE II

| Example No. | Ratio in phenol to aldehyde in base condensate | Ratio of alkylene oxide to hydroxyl group | Hydroxyl No. | Viscosity |
| --- | --- | --- | --- | --- |
| 4 | 3/2 | 2.5 ethylene oxide | 267 | 23 |
| 8 | 3/2 | 2.0 ethylene oxide+ 0.5 propylene oxide. | 256 | 21 |
| 9 | 3/2 | 1.73 ethylene oxide+ 0.76 propylene oxide. | 257 | 19 |
| 10 | 3/2 | 2.5 propylene oxide | 244 | 31 |

The following examples illustrate the preparation of additional modified phenol-aldehyde compositions in accordance with this invention.

EXAMPLE 11

This example illustrates the use of an alkylene halohydrin in the invention.

Into a five liter three-necked flask were charged 520 grams of a phenol-aldehyde condensate prepared as described in Example 1 and 600 grams of ethyl alcohol. To the mixture were added 880 grams of a 37 percent sodium hydroxide solution. The solution was heated to 80 degrees centigrade and 443 grams of ethylene chlorohydrin were added over a period of one hour. The reaction was refluxed until free of phenolic hydroxyl, the alcohol was distilled off and the product washed with hot water until free of salt. The residue was dried by heating to 150 degrees centigrade under vacuum.

EXAMPLE 12

312 grams of the phenol-aldehyde condensate prepared in Example 1, 267 grams of ethylene carbonate and 1.5 grams of potassium carbonate were mixed together and heated to 170 to 180 degrees centigrade under a stream of $N_2$. Carbon dioxide was evolved. After six hours, the product was free of phenolic hydroxyl and had a hydroxyl number of 357.

EXAMPLE 13

312 grams of the phenol-aldehyde condensate prepared in Example 1, 290 grams of propylene carbonate and 1.5 grams of potassium carbonate were mixed together and heated to 170 to 180 degrees centigrade under a stream of $N_2$ for 12 hours. Carbon dioxide was evolved. The product was free of phenolic hydroxyl and had a hydroxyl number of 338.

The following examples illustrate the method of preparing the condensation products of the invention by condensing an oxyalkylated phenol with an aldehyde.

EXAMPLE 14

One mole of phenol was reacted with two moles of ethylene oxide and thereafter 364 parts by weight of the hydroxyethylated product were mixed with 70 parts of a 37 percent aqueous formaldehyde solution, and 4.3 parts of concentrated hydrochloric acid solution. The reactants were refluxed until the residual carbonyl concentration was reduced to zero. The reaction product was stripped at 180 degrees centigrade and under full vacuum. The resulting product (341 parts) had a hydroxyl number of 253.

The following example illustrates the preparation of a hydroxyalkylated methylol phenolic resin for use in the invention.

EXAMPLE 15

40 parts of sodium hydroxide were dissolved in 470 parts of water. To the solution were added 116 parts of propylene oxide and 263 parts of a phenol-aldheyde condensate prepared by reacting one mole of phenol and three moles of formaldehyde and dehydrating to about 70 percent solids. The mixture was reacted for 16 hours at 40 degrees centigrade and was essentially free of propylene oxide. The sodium hydroxide was neutralized with 60 parts of acetic acid and the water was removed by azeotropic distillation with benzene at reduced pressure. The sodium acetate was allowed to precipitate from the resin-benzene mixture and was thus essentially removed. The benzene was removed by drying under vacuum. The hydroxyalkylated phenol-aldehyde condensation product was a viscous semi-solid product.

EXAMPLE 16

An oxyalkylated phenol-formaldehyde resin was prepared as follows using both ethylene oxide and propylene oxide in the oxyalkylation step.

First, 3,000 parts of phenol were reacted with 780 parts by weight of formalin (37 percent aqueous formaldehyde solution) using the procedure set forth in Example 1 to produce a phenol-formaldehyde novolac resin. Thereafter, the novolac resin was oxyalkylated using the procedure of Example 1, first with 550 parts by weight of ethylene oxide, and thereafter with 726 parts by weight of propylene oxide. The resulting resin had a hydroxyl number of 301 and a Gardner viscosity of 40 seconds at 50 degrees centigrade.

Polyurethane compositions of the invention were prepared in accordance with the following examples.

EXAMPLE 17

70 parts by weight of the oxyalkylated novolac resin of Example 16 were blended with 5 parts by weight of triethanolamine, 7.5 parts by weight of tris(beta-chloroethyl) phosphate, 5 parts by weight of ethylene glycol and 12.5 parts by weight of the reaction product of pentaerythritol and propylene oxide having a molecular weight of 550, a hydroxyl number of 450 and containing about 2 moles propylene oxide per alcoholic hydroxyl group. To the thus-prepared polyol blend were added 0.15 part by weight of N-methyl morpholine, 30 parts by weight of trichlorofluoromethane and 1 part by weight of a polysiloxane polyoxyalkylene block copolymer cell controller prepared in accordance with the disclosure of U.S. Patent No. 2,834,748. The resulting blend was mixed with 102 parts by weight of polyphenyl polyisocyanate with vigorous agitation for 30 seconds. The resulting prefoam was poured into a panel mold measuring 2 feet by 4 feet by 4 inches. The cream time was observed to be 55 seconds and the rise time was 199 seconds. The polyurethane foam panel had a density of 2 pounds per cubic foot and was cured for 24 hours at ambient temperature. Three pieces of the polyurethane foam measuring 6 inches by 2.75 inches by 13 inches were cut from the foam panel and placed in a deep freezer unit at −20 degrees Fahrenheit for 24 hours. The pieces of polyurethane foam did not exhibit any sign of deformation after the low temperature treatment.

EXAMPLE 18

70 parts of the oxyalkylated phenol-formaldehyde novolac resin of Example 16 were blended with 5 parts of ethylene glycol, 5 parts of triethanolamine, 12.5 parts of the pentaerythritol-propylene oxide reaction product of Example 17 and 7.5 parts of the phosphorus compound designed hereinbefore by the Formula I. To the foregoing polyol blend were mixed 1 part of tetramethyl guanidine, 0.5 part of N-methyl morpholine, 1 part of water, 0.2 part of dibutyltin dilaurate, 1 part of the cell controller of Example 17 and 27 parts of trichlorofluoromethane. The resulting blend was mixed with 125 parts of polymethylene polyphenylisocyanate with vigorous agitation for 30 seconds and the resulting prefoam was sprayed onto a vertical wall. The prefoam expanded and cured rapidly to provide a polyurethane foam coating of about 2 pounds per cubic foot density that did not otherwise sag or distort during the curing step.

EXAMPLE 19

To 100 parts by weight of the polyol blend of Example 17 were added 2 parts by weight of tetramethyl guanidine, 0.5 part of N-methyl morpholine, 1 part of water, 0.2 part of dibutyltin dilaurate, 18 parts of trichlorofluoromethane and 1 part of the cell controller of Example 17. The resulting blend was mixed with 125 parts of polymethylene polyphenylisocyanate with vigorous agitation. The polyol stream temperature was 82 degrees Fahrenheit and the isocyanate stream temperature was 85 degrees Fahrenheit. A polyurethane foam was produced having a density of 2.02 pounds per cubic foot. The physical properties of the polyurethane foam are shown in Table III.

EXAMPLE 20

To 100 parts by weight of the polyol blend of Example 17 were added 1 part by weight of the cell controller of Example 17, 0.5 part by weight of N-methyl morpholine and 26 parts by weight of trichlorofluoromethane. The resulting blend was mixed with 101 parts of polymethylene polyphenylisocyanate and 10 parts by weight of dichlorodifluoromethane, and was vigorously agitated and dispensed as a froth into a panel mold to produce a polyurethane foam having a density of 2.4 pounds per cubic foot. The properties of the polyurethane foam are shown in Table III.

EXAMPLE 21

To 100 parts by weight of the polyol blend of Example 17 were added 0.5 part by weight of N-methyl morpholine, 0.5 part by weight of triethylamine, 1 part by weight of the cell controller of Example 17 and 30 parts by weight of trichlorofluoromethane. The resulting blend was mixed with 101 parts by weight of polymethylene polyphenylisocyanate with vigorous agitation and was dispensed into a panel mold provided with plywood faces. The polyurethane composition expanded into a foam having a density of about 2 pounds per cubic foot. When the foam panel was removed from the mold it was found to have excellent adhesion to the plywood faces.

EXAMPLE 22

The procedure of Example 17 was repeated using as the alcoholic polyol component the reaction product of pentaerythritol and propylene oxide having the following characteristics:

| Average molecular weight: | Hydroxyl number |
|---|---|
| 600 | 374 |
| 400 | 560 |

Polyurethane foams are also produced with these components.

EXAMPLE 23

The procedure of Example 17 was repeated using as the alcoholic polyol component the reaction product of α-methyl glucoside and propylene oxide having the following characteristics:

| Hydroxyl number: | Viscosity, centipoise at 25 degrees centigrade |
|---|---|
| 376 | 30,000 |
| 437 | 70,000 |
| 498 | 170,000 |

Useful polyurethane foams are produced.

EXAMPLE 24

Polyurethane products having good physical properties are also produced using as the alcoholic polyol component reaction products of sorbitol and propylene oxide having hydroxyl numbers of 480 and 640.

The following example shows the process of the invention wherein the mixture of components (A) and (B) is prepared in one step by oxyalkylation of the mixture of a phenol-aldehyde condensaate and a polyhydric alcohol.

EXAMPLE 25

To 2060 parts of phenol-formaldehyde novolac resin prepared in Example 16 were added 206 parts of pentaerythritol and 11 parts of anhydrous sodium acetate. Then 1010 parts of ethylene oxide and 1080 parts of propylene oxide were added in sequence to the resin at 180 to 210 degrees centigrade. The polyol product had a hydroxyl number of 324.

80 parts of the resulting polyol product were blended with 10 parts of ethylene glycol, 5 parts of tris(beta-chloroethyl) phosphite, 5 parts of triethanolamine, 0.5 part of N-methyl morpholine, 1.0 part of a cell controller of the type used in Example 17, and 30 parts of trichlorofluoromethane. The resulting blend was mixed with 118 parts of polymethylene polyphenylisocyanate with vigorous agitation and dispensed into a panel mold measuring 4 inches by 30 inches by 22 inches to produce a foam with a core density of 1.93 pounds per cubic foot. The top quarter of the panel was refrigerated at −20 degrees Fahrenheit for 24 hours, and no shrinkage was observed. The remainder of the panel was tested, and the properties of the foam are shown in Table III.

TABLE III

| Example No | 19 | 20 | 25 |
|---|---|---|---|
| Tensile strength, pounds per square inch, perpendicular | 47.3 | | |
| Compressive strength, pounds per square inch: | | | |
| Parallel at 25 degrees centigrade | 23.4 | 41.1 | 18 |
| Perpendicular at 25 degrees centigrade | 18.2 | 15.6 | 14 |
| Compressive Modulus, pounds per square inch: | | | |
| Parallel at 25 degrees centigrade | 708 | 1640 | 478 |
| Perpendicular at 25 degrees centigrade | 508 | 434 | 417 |
| Flammability, ASTM D-1692-59T | (1) | (1) | (2) |
| Thermal stability: | | | |
| 1 hour at 125 degrees centigrade: | | | |
| Percent weight change | −1.08 | −1.52 | −1.7 |
| Percent volume change | −6.64 | 16.05 | +4.1 |
| 5 percent volume expansion, temperature degrees centigrade | | 98.2 | 128 |
| 24 hours at −20 degrees Fahrenheit: | | | |
| Percent weight change | −0.14 | | |
| Percent volume change | −1.36 | | |
| 1 week at 70 degrees centigrade, 100 percent relative humidity, percent volume change | | | +29.2 |
| K-Factor, B.t.u. per square foot (hour) (degrees Fahrenheit per inch | | 0.13 | |
| Friability, percent weight change | | −5.49 | |

1 Self-extinguishing.
2 Non-burning.

While this invention has been described with reference to certain specific embodiments, it will be recognized by those skilled in the art that many variations are possible without departing from the spirit and scope of the invention.

We claim:
1. A composition useful in preparing a low temperature-stable polyurethane comprising (A) a component having the formula:

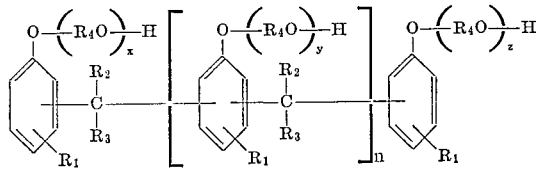

wherein:
$n$ has an average value of about 0.2 to 5;
$x$, $y$ and $z$ are integers from 1 to 25;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen-substituted hydrocarbon radical; and
$R_4$ is a hydrocarbon radical of 2 to 18 carbon atoms;
(B) a polyol of an alcohol having four to six hydroxyl groups, and at least one mole of a 1,2-epoxide reacted per hydroxyl group of the alcohol;
(C) a dihydric alcohol of 2 to 10 carbon atoms;
(D) an alkanolamine; and
(E) a phosphorus compound.

2. The composition of claim 1 wherein $R_1$, $R_2$ and $R_3$ are hydrogen and $x$, $y$ and $z$ are integers from 1 to 10.

3. The composition of claim 2 wherein $R_4$ is an ethylene radical.
4. The composition of claim 2 wherein $R_4$ comprises ethylene and propylene radicals.
5. The composition of claim 4 wherein the alcohol of component (B) is pentaerythritol.
6. The composition of claim 4 wherein the component (B) is the reaction product of pentaerythritol and propylene oxide.
7. The composition of claim 5 wherein the dihydric alcohol is ethylene glycol.
8. The composition of claim 7 wherein the alkanolamine is diethanolamine.
9. The composition of claim 8 wherein the phosphorus compound is tris(beta-chloroethyl) phosphate.
10. The polyurethane product of components comprising the composition of claim 1 and an organic polyisocyanate, said polyisocyanate being present in a proportion sufficient to provide 85 to 115 percent of reactive isocyanato groups with respect to the total number of hydroxyl and equivalent groups present in said composition of claim 1.
11. The cellular reaction product of components comprising the composition of claim 1, an organic polyisocyanate and a foaming agent; said polyisocyanate being present in a proportion sufficient to provide 85 to 115 percent of reactive isocyanato groups with respect to the total number of hydroxyl and equivalent groups present in said composition of claim 1 and the foaming agent.
12. The cellular product of claim 11 wherein $R_1$, $R_2$ and $R_3$ are hydrogen and $x$, $y$ and $z$ are integers from 1 to 10.
13. The cellular product of claim 12 wherein $R_4$ is an ethylene radical.
14. The cellular product of claim 12 wherein $R_4$ comprises ethylene and propylene radicals.
15. The cellular product of claim 14 wherein the alcohol component (B) is pentaerythritol.
16. The cellular product of claim 14 wherein the component (B) is the reaction product of pentaerythritol and propylene oxide.
17. The cellular product of claim 15 wherein the dihydric alcohol is ethylene glycol.
18. The cellular product of claim 17 wherein the alkanolamine is diethanolamine.
19. The cellular product of claim 18 wherein the phosphorus compound is tris(beta-chloroethyl)phosphate.

References Cited

UNITED STATES PATENTS

| 3,159,591 | 12/1964 | Lanham | 260—2.5 |
| 3,214,396 | 10/1965 | Schoepfle et al. | 260—2.5 |
| 3,222,305 | 12/1965 | Lanham | 260—2.5 |
| 3,245,922 | 4/1966 | Worsley et al. | 260—2.5 |
| 3,257,337 | 6/1966 | Schoepfle et al. | 260—2.5 |

DONALD E. CZAJA, Primary Examiner
MICHAEL B. FEIN, Assistant Examiner

U.S. Cl. X.R.
252—182; 260—75, 77.5

UNITED STATES PATENT OFFICE
CERTIFICATE OF CORRECTION

Patent No. 3,497,465          Dated February 24, 1970

Inventor(s) Francis M. Kujawa, Richard B. Tideswell & Gerald R. Chamberlain

It is certified that error appears in the above-identified patent and that said Letters Patent are hereby corrected as shown below:

Column 3, line 34, the "," after the word "methyl" should be deleted. Column 4, line 10, the word "preferbaly" should read ---preferably---. Column 8, line 13, the phrase "and other compounds" should read ---and other such compounds---. Column 8, line 18, that portion of the formula reading

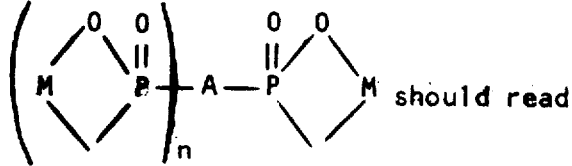 should read 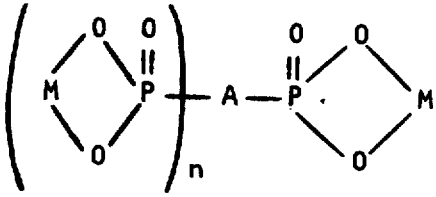

Column 8, line 32, the word "butant" should read ---butane---. Column 8, line 59, the formula should appear as follows: $CH_3\overset{|}{C}HCH_2Cl-$, Column 8, line 60, the formula should appear as follows: $ClCH_2-\overset{|}{C}H-CH_2Br$ Column 10, line 25, the word "phospate" should read ---phosphate---.
Column 13, line 43, the word "designed" should read ---designated---.
Column 14, line 54, the word "condensaate" should read ---condensate---.

SIGNED AND
SEALED

SEP 29 1970

(SEAL)
Attest:

Edward M. Fletcher, Jr.
Attesting Officer

WILLIAM E. SCHUYLER, JR.
Commissioner of Patents